United States Patent
Nilsson

(10) Patent No.: US 8,405,731 B2
(45) Date of Patent: Mar. 26, 2013

(54) METHOD FOR COMPENSATING HARDWARE MISALIGNMENTS IN A CAMERA

(75) Inventor: Martin Nilsson, Lund (SE)

(73) Assignee: Axis AB, Lund (SE)

( * ) Notice: Subject to any disclaimer, the term of this patent is extended or adjusted under 35 U.S.C. 154(b) by 1444 days.

(21) Appl. No.: 12/029,663

(22) Filed: Feb. 12, 2008

(65) Prior Publication Data

US 2008/0204560 A1 Aug. 28, 2008

Related U.S. Application Data

(60) Provisional application No. 60/902,546, filed on Feb. 20, 2007.

(30) Foreign Application Priority Data

Feb. 19, 2007 (EP) .................................. 07102655

(51) Int. Cl.
 H04N 5/228 (2006.01)
(52) U.S. Cl. .............. 348/208.7; 348/207.99; 348/211.9
(58) Field of Classification Search .................. 348/187, 348/208.3, 208.7, 211.99, 211.9
 See application file for complete search history.

(56) References Cited

U.S. PATENT DOCUMENTS

| | | | |
|---|---|---|---|
| 5,627,616 A | 5/1997 | Sergeant et al. | |
| 5,691,765 A | 11/1997 | Schieltz et al. | |
| 5,990,935 A | 11/1999 | Rohlfing | |
| 6,744,461 B1 | 6/2004 | Wada et al. | |
| 7,110,022 B2 | 9/2006 | Aoyama | |
| 7,151,562 B1 * | 12/2006 | Trajkovic | 348/211.13 |
| 2002/0003965 A1 * | 1/2002 | Landelle et al. | 396/661 |
| 2003/0210329 A1 | 11/2003 | Aagaard et al. | |
| 2005/0036036 A1 * | 2/2005 | Stevenson et al. | 348/211.99 |
| 2005/0057656 A1 | 3/2005 | Chardon et al. | |
| 2005/0117023 A1 | 6/2005 | Seo | |
| 2005/0275723 A1 | 12/2005 | Sablak et al. | |
| 2006/0055777 A1 | 3/2006 | Ito et al. | |
| 2006/0139484 A1 | 6/2006 | Seo et al. | |
| 2006/0203098 A1 | 9/2006 | Henninger et al. | |

(Continued)

FOREIGN PATENT DOCUMENTS

| | | |
|---|---|---|
| JP | 02-282881 | 11/1990 |
| JP | 2004088558 | 3/2004 |

(Continued)

OTHER PUBLICATIONS

Chen et al., "Scalable Alignment of Large-Format Multi-Projector Displays Using Camera Homography Trees", IEEE Visualization (Vis2002), (Oct. 2002).

(Continued)

*Primary Examiner* — Pankaj Kumar
*Assistant Examiner* — Timothy Newlin
(74) *Attorney, Agent, or Firm* — Volpe and Koenig, P.C.

(57) ABSTRACT

A method for compensating hardware misalignments in a camera is presented. The camera includes a maneuverable part and a fixed part, and the maneuverable part is controlled by a steering motor system. In a first step of the method mechanical coordinates from the steering motor system is received, wherein the mechanical coordinates correspond to a pan and tilt position, the pan and tilt position having a complementary pan and tilt position. Next, pre-determined calibration data corresponding to the received mechanical coordinates is read from a memory wherein the pre-determined calibration data describes a relationship between a pan and tilt position and a complementary pan and tilt position, and then compensated coordinates are determined based upon the received mechanical coordinates and the pre-determined calibration data.

22 Claims, 11 Drawing Sheets

U.S. PATENT DOCUMENTS

| | | |
|---|---|---|
| 2006/0209186 A1 | 9/2006 | Iyoda et al. |
| 2006/0215031 A1 | 9/2006 | Krahnstoever et al. |
| 2007/0116458 A1* | 5/2007 | McCormack ............... 396/427 |

FOREIGN PATENT DOCUMENTS

| | | |
|---|---|---|
| JP | 2006121584 | 5/2006 |
| JP | 2006-253975 | 9/2006 |
| KR | 5013313 | 2/2005 |
| WO | 01/43072 | 6/2001 |
| WO | 0143072 A1 | 6/2001 |

OTHER PUBLICATIONS

Davis et al., "Calibrating Pan-Tilt Cameras in Wide-Area Surveillance Networks", Proceedings of the Ninth IEEE International Conference on Computer Vision (ICCV'03), pp. 144-149, (Oct. 2003).

Finlan et al., "Precision Refractive Zoom Lens with Long Focal Length", Special Optics Manufacturing and Design, (Jun. 2006).

Panoguide, "Using a panoramic head", Retrieved from C:\Documents and Settings\CDuncan\Local Settings\Temporary Internet Files\OLKA2\080411 panoguide Using a panor (3).mht, (Last visited Apr. 21, 2008).

Tarabanis et al., "Modeling of a Computer-Controlled Zoom Lens", 1992 IEEE International Conference on Robotics and Automation, vol. 2, pp. 1545-1551, (May 12-14, 1992).

Willson et al., "A Perspective Projection Camera Model for Zoom Lenses", Robotic Institute, Carnegie Mellon University, (Pittsburgh, Pennsylvania, 1993).

Willson et al., "Active Lens Control for High Precision Computer Imaging", Proceedings of the 1991 IEEE International Conference on Robotics and Automation, pp. 2063-2070, (Sacramento, California, Apr. 1991).

Willson et al., "What is the Center of the Image?", The Robotics Institute, Carnegie Mellon University, (Apr. 1993).

Willson, "Modeling and Calibration of Automated Zoom Lenses", Ph.D. Dissertation, The Robotics Institute, Carnegie Mellon University, (Pittsburgh, Pennsylvania, Jan. 1994).

Zheng et al., "A High-Precision Camera Operation Parpameter Measurements System and Its Application to Image Motion Inferring", Image Processing, 1999. ICIP 99. Proceedings. 1999 International Conference on vol. 3, pp. 695-699, (Oct. 24-28, 1999).

Zheng W. et al. "A high-precision camera operation parpameter measurement system and its application to image motion inferring" Image Procesing, 1999. ICIP 99., Proceedings. 1999 International Conference on Kobe, Japan Oct. 24-28, 1999, Piscataway, NJ, USA, IEEE, US, vol. 3, Oct. 24, 1999, pp. 695-699, XP010368797 ISBN: 0-7803-5467-2, p. 696, left-hand column, line 2- p. 697, left hand column, last line.

Davis J. et al. "Calibrating pan-tilt cameras in wide-area surveillance networks," Proceedings of the Eight IEEE Int'l Conference on Computer Vision. (ICCV). Nice, France, Oct. 13-16, 2003, Int'l Conference on Computer Vision, Los Alamitos, CA: IEEE Comp. Soc., US., vol. 2 of 2 Conf. 9, Oct. 13, 2003, pp. 144-149, XP010662283, ISBN: 0-7695-1950-4, p. 142, left-hand column—right-hand column.

JP Office Action issued Jul. 27, 2012 in counterpart Japanese Patent Application No. 2008-035824.

* cited by examiner

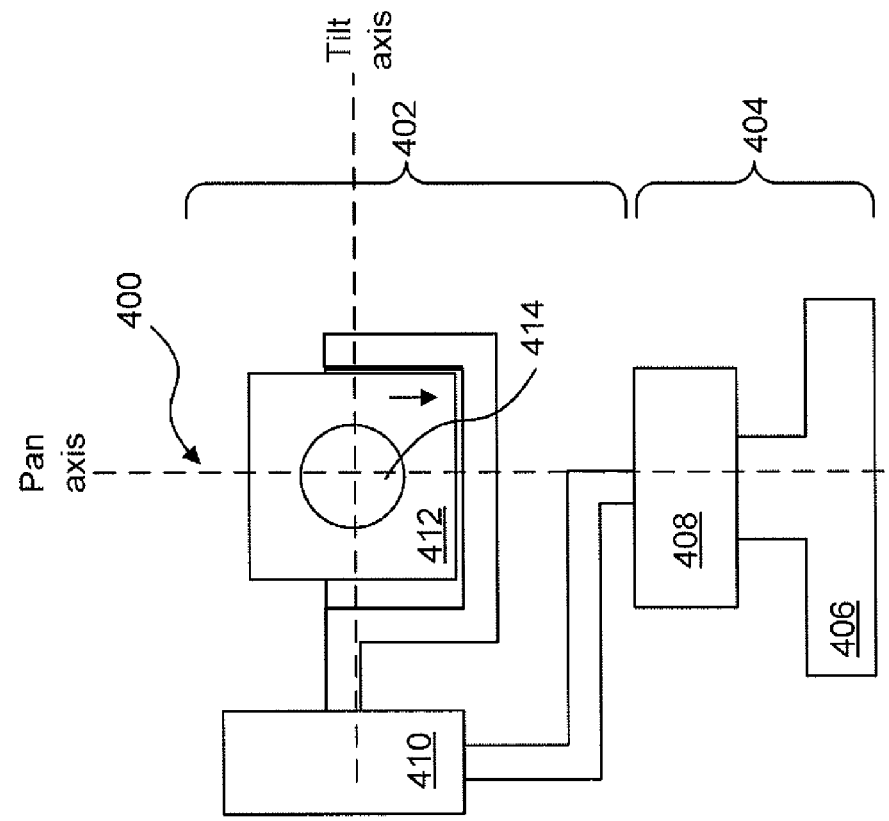
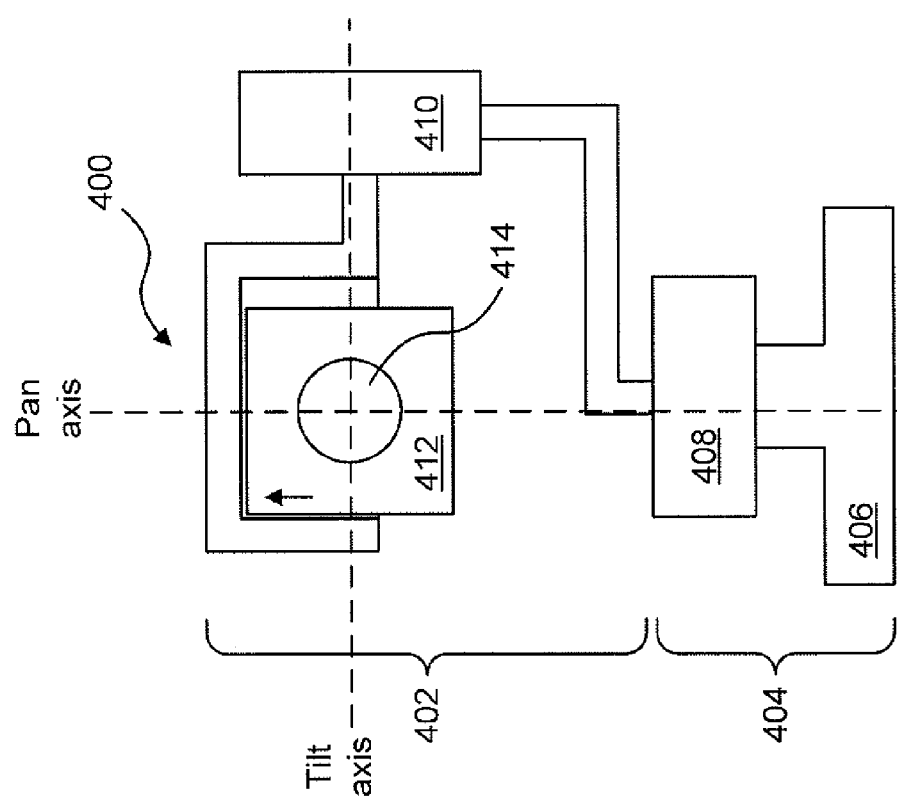

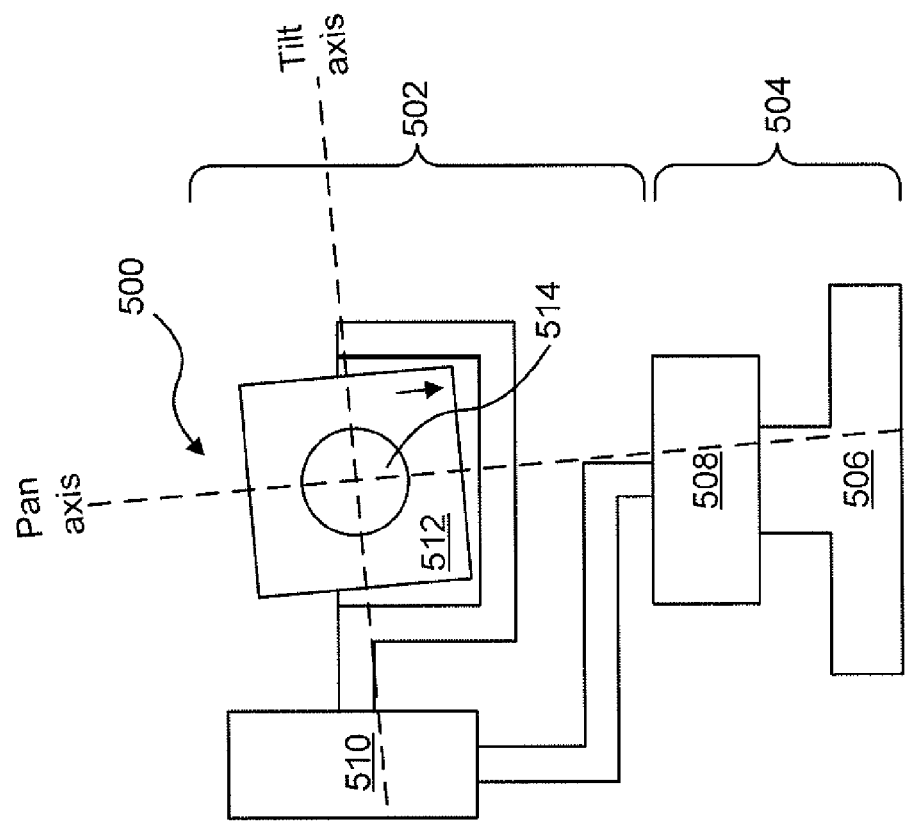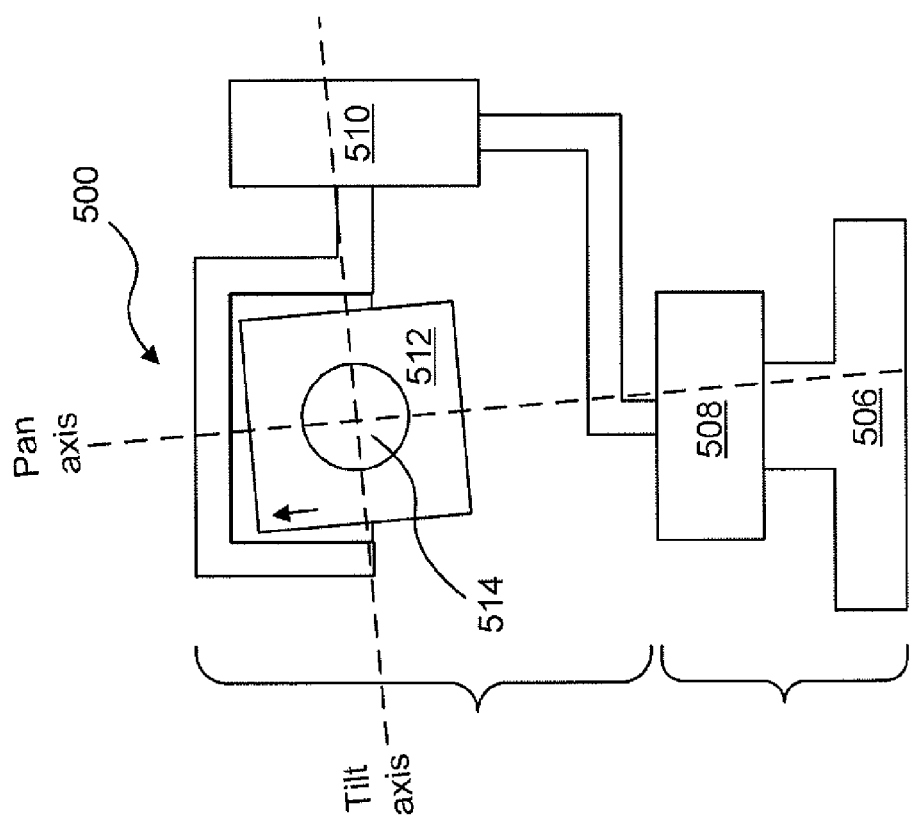

METHOD FOR COMPENSATING HARDWARE MISALIGNMENTS IN A CAMERA

CROSS REFERENCE TO RELATED APPLICATIONS

This application claims the benefit of U.S. provisional application No. 60/902,546, filed Feb. 20, 2007, the entire contents of which are incorporated by reference as if fully set forth.

FIELD OF INVENTION

The present invention generally relates to a method for compensating hardware misalignments in a camera, a camera and a system comprising a camera and a user interface apparatus.

BACKGROUND

Today, PTZ (Pan Tilt Zoom) cameras and dome cameras are very popular. The main reason for this is that the operator is able to remotely manoeuvre these cameras. For instance, if the operator discovers a suspect object he may direct the camera towards this object by using a steering motor system comprised in the camera. Further, in some cameras, it is also possible to zoom in or out in order to get a desired field of view.

In order to achieve a camera with a good control function, a high quality steering motor system is of great importance. Firstly, the number of steps is important, since a large number of steps makes a precise control of the camera possible. Secondly, it is important that the camera is designed and mounted correctly, since an incorrect mounting will deteriorate the control of the camera.

If a zooming function is available in the camera, it is further important that the lenses in the lens system of the camera are mounted and directed properly. Otherwise, a displacement error will arise when using the zooming function.

Hence, there is a need to deal with imperfections in camera direction operation.

SUMMARY

According to a first aspect the invention relates to a method for compensating hardware misalignments in a camera comprising a maneuverable part and a fixed part, wherein said maneuverable part is controlled by a steering motor system, said method comprising receiving mechanical coordinates from said steering motor system, wherein the mechanical coordinates correspond to a pan and tilt position, the pan and tilt position having a complementary pan and tilt position, reading pre-determined calibration data corresponding to said received mechanical coordinates from a memory comprised in said camera, wherein the pre-determined calibration data describes a relationship between a pan and tilt position and a complementary pan and tilt position, and determining compensated coordinates based upon said received mechanical coordinates and said pre-determined calibration data.

According to a second aspect, the invention relates to a camera comprising a maneuverable part comprising an optical system, a fixed part, a steering motor system arranged to control said maneuverable part, a memory arranged to hold pre-determined calibration data, a processor configured to receive mechanical coordinates from said steering motor system, wherein said mechanical coordinates correspond to a pan and tilt position, said pan and tilt position having a complementary pan and tilt position, to read pre-determined calibration data from said memory, wherein said pre-determined calibration data corresponds to said mechanical coordinates and wherein said pre-determined calibration data describes a relationship between said pan and tilt position and said complementary pan and tilt position, and to determine compensated coordinates based upon said mechanical coordinates and said pre-determined calibration data.

The same advantages of the first aspect are also applicable for this second aspect.

Furthermore, said hardware misalignments of said camera may be caused by rotation around at least one axis in the group of a pan axis and a tilt axis. The invention relates, in a third aspect, to a system comprising a data network, a user interface apparatus connected to said data network, and at least one camera as described above.

In a fourth aspect, the invention relates to a computer program comprising software instructions arranged to perform the method as described above when downloaded and run in an apparatus.

Other features and advantages of the present invention will appear from the following detailed disclosure, from the attached dependent claims as well as from the drawings.

Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of said element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings, wherein:

FIGS. 4a-4f illustrate examples of maneuverable cameras with a displaced camera block in an upright position and a flipped position, respectively.

FIGS. 5a and 5b illustrate another example of a maneuverable camera with a displaced camera block in an upright position and a flipped position, respectively.

DETAILED DESCRIPTION OF THE PREFERRED EMBODIMENTS

Introduction to the Embodiments

Figure 1:
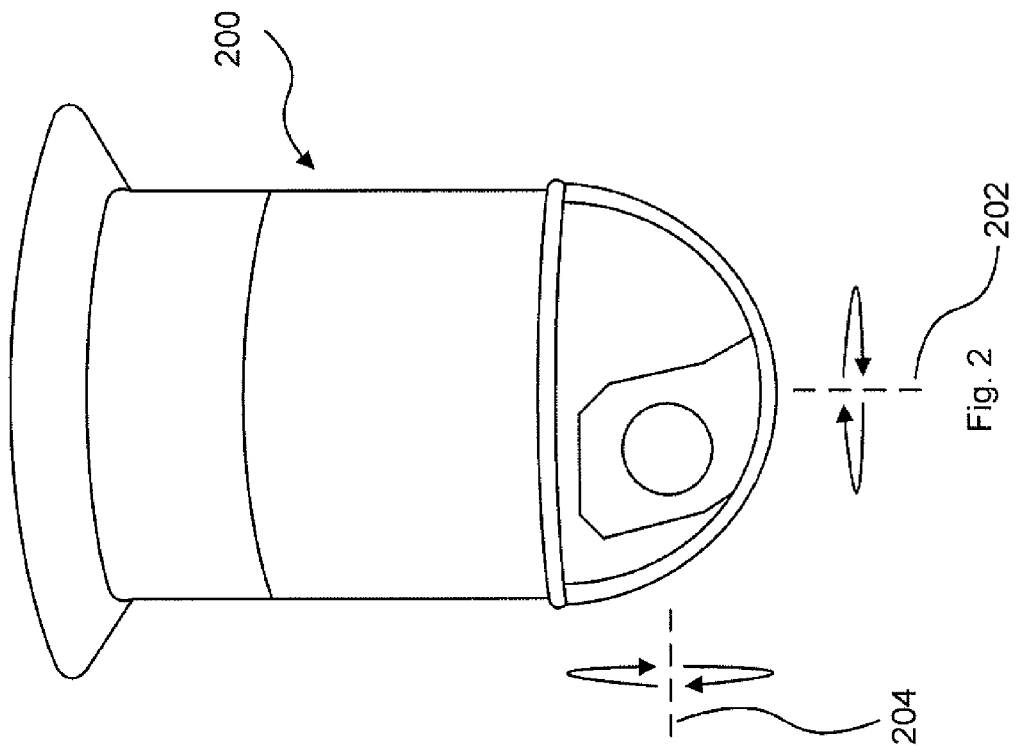
FIG. 1 illustrates an example of a PTZ (Pan Tilt Zoom) camera.

An advantage of this method is that absolute coordinates are achieved, which e.g. means that it is possible to return to a specific point if knowing the coordinates.

Another advantage of achieving absolute coordinates is that an improved mask function may be achieved. For instance, if a certain area of the image, such as a door, is marked by a privacy mask, the coordinates of this privacy mask will be remembered independent of the mechanical coordinates of the camera. Yet another advantage is that it is possible to pre-set positions.

Still an advantage is that the function of the camera is less dependent of manufacturing inaccuracies.

Further, the maneuverable part may comprise a zooming optical system, and the method may then comprise receiving at least one zoom position of said zooming optical system, reading pre-determined calibration data corresponding to said at least one zoom position from said memory, and determining compensated coordinates based upon said received at least one zoom position and said pre-determined calibration data.

An advantage of this is that optical misalignments, which may vary for different zoom positions, may be compensated.

The method may further comprise transmitting said compensated coordinates from said camera to a user interface apparatus, and presenting said compensated coordinates on said user interface apparatus.

An advantage of this is that the user of the camera may see the position of the camera in absolute coordinates.

The method may further comprise transmitting image data to an image handling device, transmitting said compensated coordinates to said image data handling device, and processing said image data and said compensated coordinates in said image data handling device.

Further, the method may further comprise receiving camera target coordinates, reading pre-determined calibration data corresponding to said received camera target coordinates from said memory comprised in said camera, determining camera target mechanical coordinates based upon said received camera target coordinates and said pre-determined calibration data, and moving said maneuverable part of said camera in accordance to said determined camera target mechanical coordinates.

The camera target coordinates may be received from a user interface apparatus or from an image handling device.

An advantage of this is that if a position is given by the user, via a user interface apparatus, in compensated coordinates, these compensated coordinates are transformed into mechanical coordinates, and the camera may be moved to the given position, which for instance may be achieved by a mouse click in an image.

Further, a pan range of said maneuverable part may be equal or greater than 180° thereby enabling said maneuverable part to reach at least one view by using a plurality of different mechanical coordinates, wherein said pre-determined calibration data may comprise a combination of a set of said plurality of different mechanical coordinates.

Moreover, the plurality of different mechanical coordinates may comprise a set of upright mechanical coordinates and a set of flipped mechanical coordinates. Thus the set of upright mechanical coordinates and the set of flipped mechanical coordinates together form two sets of mechanical coordinates.

Further, the pre-determined calibration data may comprise at least one difference value determined by subtracting one of said different mechanical coordinates by a theoretic value.

Additionally, the pre-determined calibration data may comprise an intermediate position of said set of said plurality of different mechanical coordinates.

Furthermore, said hardware misalignments may be caused by rotation around at least one axis in the group of a pan axis and a tilt axis.

Further, the optical system of said maneuverable part may comprise a zooming optical system, and said processor may further be configured to receive at least one zoom position from said zooming optical system, and to determine compensated coordinates based upon said at least one received zoom position and said pre-determined calibration data.

The camera may further comprise a transmitter adapted to transmit said compensated coordinates from said camera to a user interface apparatus.

The transmitter may further be adapted to transmit image data and said compensated coordinates to an image handling device.

The processor may further be configured to receive camera target coordinates, to read pre-determined calibration data corresponding to said received camera target coordinates from said memory comprised in said camera, and to determine camera target mechanical coordinates based upon said received camera target coordinates and said pre-determined calibration data, and wherein said steering motor system may be configured to move said maneuverable part of said camera in accordance to said determined camera target mechanical coordinates.

Moreover, a pan range of said maneuverable part may be equal or greater than 180° thereby enabling said maneuverable part to reach at least one field of view by using a plurality of different mechanical coordinates, wherein said pre-determined calibration data comprises a combination of a set of said plurality of different mechanical coordinates.

Moreover, a tilt range of said maneuverable part of said camera may include said pan axis.

Further, the plurality of different mechanical coordinates may comprise a set of upright mechanical coordinates and a set of flipped mechanical coordinates.

Further, the pre-determined calibration data may comprise at least one difference value determined by subtracting one of said different mechanical coordinates by a theoretic value.

Additionally, the pre-determined calibration data may comprise an intermediate position of said set of said plurality of different mechanical coordinates.

DETAILED DESCRIPTION

FIG. 1 illustrates an example of a PTZ (Pan Tilt Zoom) camera 100. This exemplified camera 100 is a network camera connected to a data network (not shown), such as a TCP/IP network. Control data is transmitted to the camera via said data network, and the image data captured by the camera 100 is transmitted via the data network to a user interface apparatus (not shown).

A maneuverable part of the camera 100 is arranged to rotate around a pan axis 102 and a tilt axis 104, wherein the pan axis 102 is perpendicular to the tilt axis 104. Most often, the pan range of a PTZ camera 100 is limited to about 360° by a mechanical stop, and the tilt range is in many cases about 180°.

Figure 2:
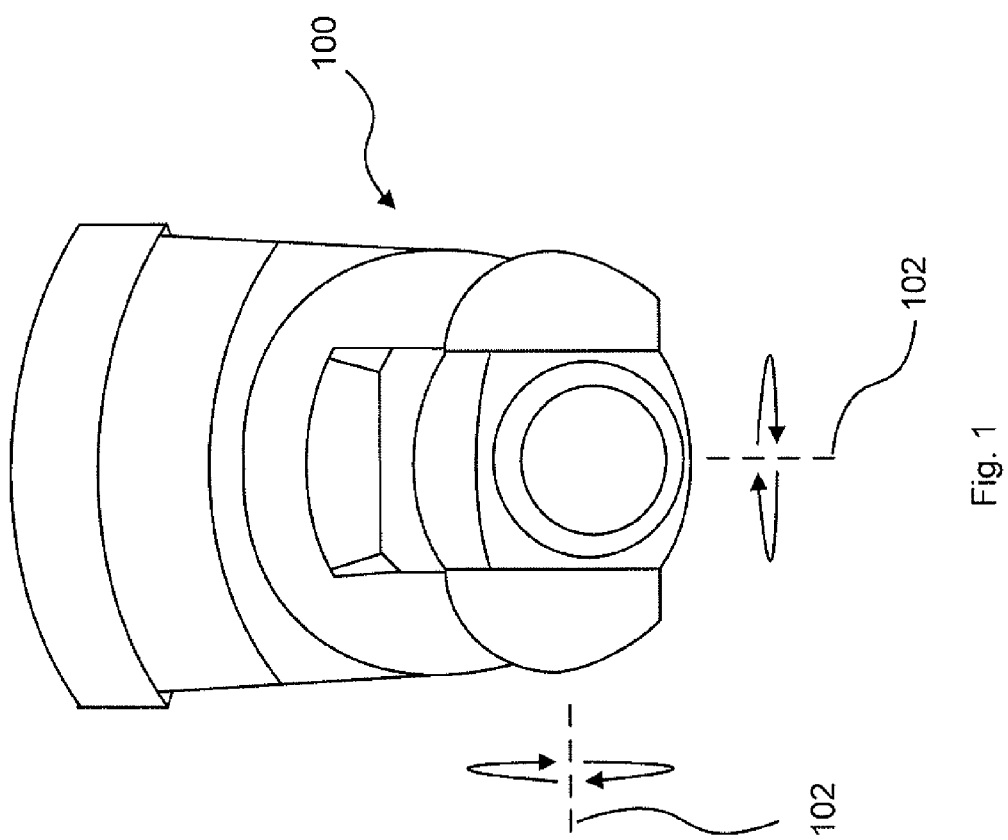
FIG. 2 illustrates an example of a dome camera.

FIG. 2 illustrates an example of a dome camera. The function of the dome camera 200 is similar to the PTZ camera 100. In order to control the direction, a maneuverable part of the camera 200 is rotatably arranged around a pan axis 202 and a tilt axis 204, wherein the pan axis 202 is perpendicular to the tilt axis 204.

Unlike the PTZ camera, most dome cameras are arranged to rotate freely around the pan axis. The tilt range of a dome camera is in many cases about 180°.

A generalised embodiment of both the PTZ camera 100 and the dome camera 200 may be a camera 300 illustrated in FIG. 3. The camera 300 comprises a maneuverable part 302 and a fixed part 304. The fixed part may also be referred to as a mounting part, i.e. when mounting the camera this part is attached to e.g. the ceiling.

Figures 3A, 3B:
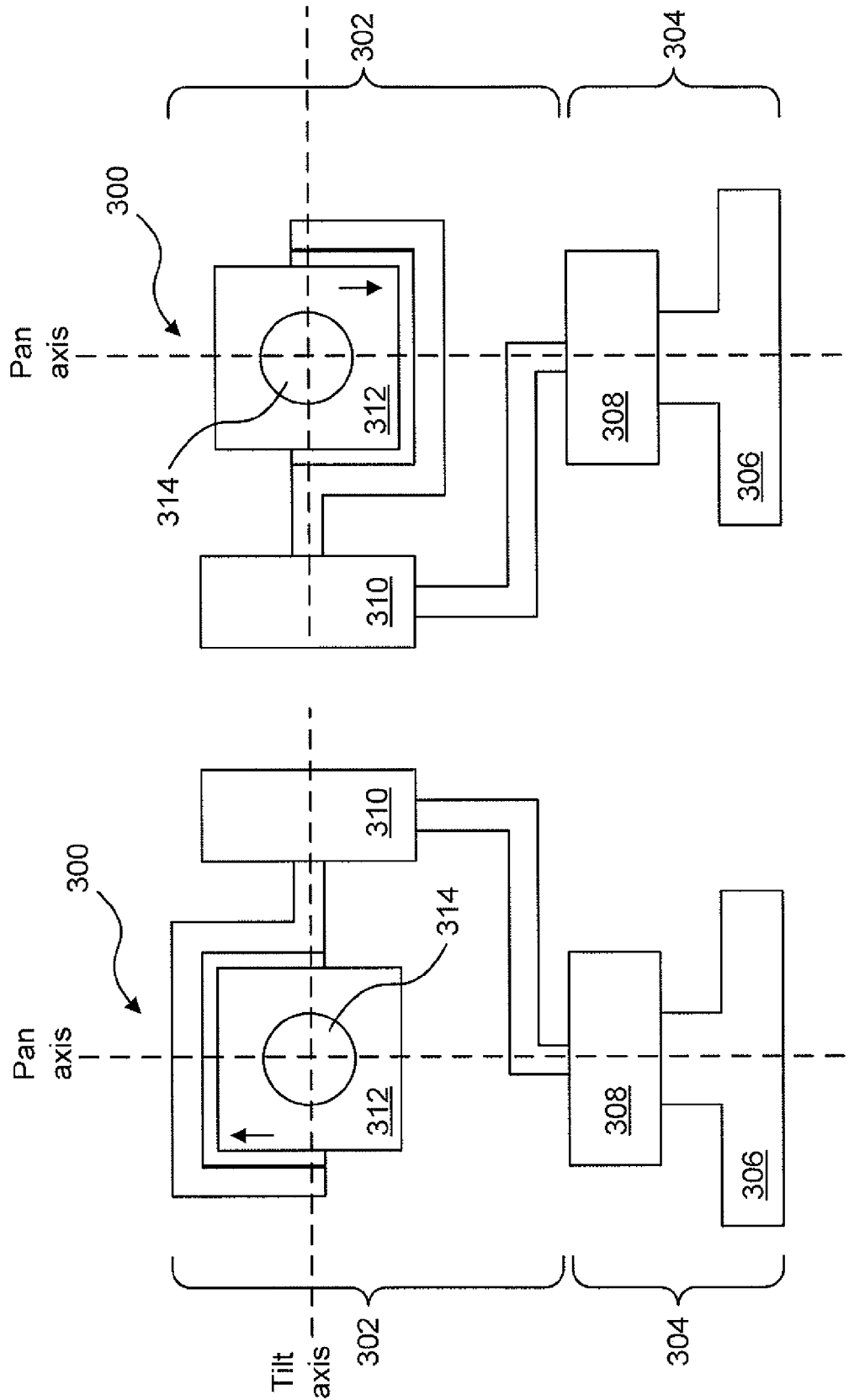
FIGS. 3a and 3b generally illustrate a maneuverable camera in an upright position and a flipped position, respectively.

The fixed part 304 comprises a mounting bracket 306 adapted to be attached to e.g. a ceiling. This mounting bracket may also be used a stand, as is illustrated in FIG. 3a, although in most cases the camera is mounted in a ceiling or similar. Further, the fixed part can comprise a pan steering motor 308. By using this pan steering motor 308 the maneuverable part 302 of the camera 300 is rotated around a pan axis. This motor 308 can be adapted to rotate freely, i.e. there are no mechanical stops, or the rotational range of the motor 308 may be limited by a mechanical stop. Such a mechanical stop may be achieved by a tap, or by a wire.

The pan steering motor 308 is connected to a tilt steering motor 310, which, hence, is part of the maneuverable part 302 of the camera 300. As the pan steering motor 308, this tilt steering motor 310 may be adapted to rotate freely, or the tilt steering motor may be limited by a mechanical stop.

The tilt steering motor 310 is in turn connected to a camera block 312, which in turn comprises an optical system 314. Hence, by using the tilt steering motor 310 the camera block 312 is rotated around a tilt axis.

By enabling the camera 300 to rotate around these two axis, pan axis and tilt axis, it is possible to reach the same field of view by using two different pan-tilt positions. With reference to the relationships below, the positions reaching the same view are defined as a pan and tilt position and a complementary pan and tilt position, respectively, wherein the view of the complementary pan and tilt position is reached by rotating the camera 300 around the two axis as disclosed above.

In FIG. 3b, the pan steering motor 308 has rotated the maneuverable part 302 half a turn, i.e. 180 degrees, and the tilt steering motor 310 has rotated the camera block 312 half a turn, i.e. 180 degrees, which has the effect, in this embodiment, that the same field of view is reached, i.e. the field of view being associated with the complementary pan and tilt position. If the mechanical coordinates of the pan steering motor and the tilt steering motor, respectively, in FIG. 3a, is referred to as an upright coordinates, the mechanical coordinates of the pan steering motor and the tilt steering motor, respectively, in FIG. 3b, is referred to as flipped coordinates. These flipped coordinates are considered as complementary coordinates to the upright coordinates. Thus the set of upright mechanical coordinates and the set of flipped mechanical coordinates together form two sets of mechanical coordinates.

The space of the upright coordinates is herein referred to as upright space and the space of the flipped coordinates are referred to as flipped space. In an embodiment of a camera having a pan range of 360 degrees and a tilt range of 180 degrees, the upright coordinates may be defined as:

Pan coordinate: $-180° \leq P_U \leq 180°$.
Tilt coordinate: $-90° \leq T_U \leq 0°$ Then the complementary coordinates in flipped space are:
Pan coordinate: $P_F = ((P_U + 360) \mod 360) - 180 - 180° \leq P_F \leq 180°$
Tilt coordinate: $T_F = -T_U - 180° - 180° \leq T_F \leq -90°$ where the operator "mod" is to be interpreted as a modulo operator. That is, for two integer numbers n1 and n2 the modulo operator (n1) modulo n2 (abbreviated as (n1) mod n2) is the remainder, on division of n1 by n2. Hence using the relationships for pan and tilt coordinates and complementary pan and tilt coordinates each position may be defined as a pan and tilt position and a complementary pan and tilt position, respectively.

The two complementary positions should theoretically display the exact same view for the user, with the difference that the camera is upside-down in the flipped position. This can automatically be fixed by rotating the image digitally when the camera is in the flipped coordinate space.

One of the biggest hardware related problems is the relations between the optical, or zoom, axis, the pan axis and the tilt axis. To get a perfect alignment between the upright and the flipped spaces, respectively, these spaces need to be orthogonal when using a 180° tilting camera. Otherwise the coordinates will not match, thereby causing a misalignment error. This will displace masks and preset positions and if the camera uses absolute movements there will result in two different pairs of coordinates for the same point of view.

FIG. 4a illustrates a camera 400, similar to the camera 300 illustrated in FIG. 3a, but unlike this camera 300, the camera block 412 of the camera 400 is displaced. This implies that the pan axis as well as the tilt axis are displaced, which, of course, is a disadvantage. FIG. 4b illustrates the camera 400 in a complementary position. Numerals with the last two digits of FIG. 3a and FIG. 3b correspond to the numerals with the two last digits of FIG. 4a and FIG. 4b. Such a displacement may arise when the camera block is mounted or because of other manufacturing inaccuracies.

Figure 4F:
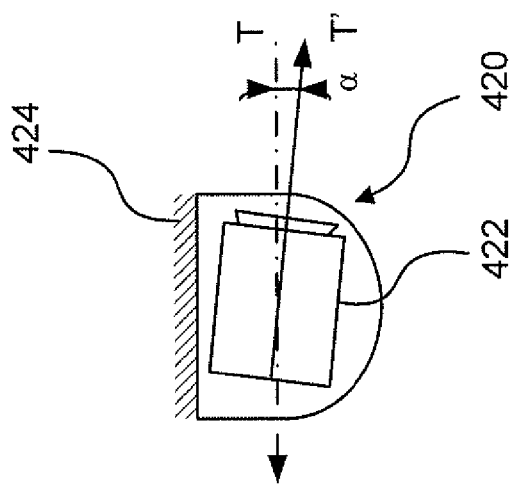

When the camera 400 is switched to the complementary position, as illustrated in FIG. 4b, the displacement error is expressed using complementary coordinates. If the image is digitally rotated, a point of the image received in the position illustrated in FIG. 4a will hence be shown differently, in terms of placement, in the image received in the position illustrated in FIG. 4b. In the exemplified situation of FIGS. 4a and 4b, the image will be displaced horizontally, as well as vertically. Usually displacement errors as discussed with references to FIG. 4a and FIG. 4b are small, the main reason being that these types of displacement errors may be significantly reduced by means of mechanical adjustments. Furthermore, displacement errors as discussed with references to FIG. 4a and FIG. 4b are usually smaller than displacement errors as will be discussed next with references to FIGS. 4c-4f.

Figure 4E:
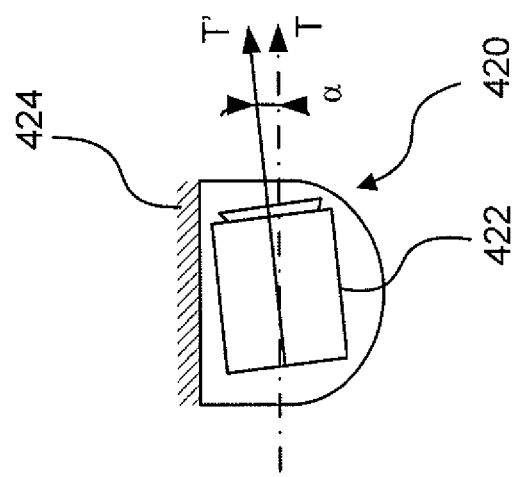
Figure 4D:
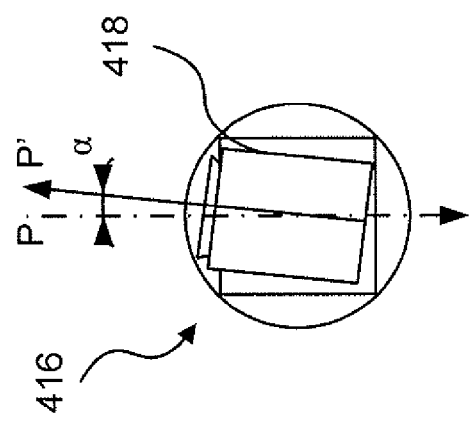
Figure 4C:
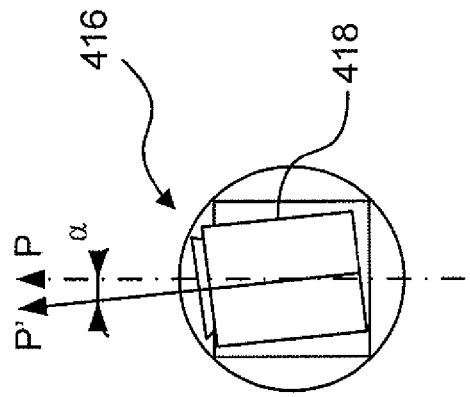

FIG. 4c is a view from below illustrating a camera 416 preferably placed in a ceiling (not shown), wherein the camera block 418 of the camera 416 is rotationally displaced by an angle α. This implies that the pan axis has been displaced from direction P to direction P' caused by a left-right mechanical misalignment, which, of course, is a disadvantage. The source of this type of error is that the camera block 418 is not centered in the pan and/or tilt axis of the mechanics, as well as the optical axis is not perfectly aligned in the camera block 418. Some misalignment here is unavoidable and the magnitude of the misalignment depends on the accuracy of the dome and the camera mechanics.

FIG. 4d illustrates the camera 416 in a complementary position, wherein the direction of the offset is inverted. In the exemplified situations of FIGS. 4c and 4d, the image will be displaced horizontally. The displacement caused by the left-right mechanical misalignment according to FIGS. 4c and 4d may be compensated for using the disclosed method.

FIG. 4e is a side view illustrating a camera 420 preferably placed in a ceiling 424, and wherein the camera block 422 of the camera 420 is rotationally displaced by an angle α. This implies that the tilt axis has been displaced from direction T to direction T' caused by an up-down mechanical misalignment, which, of course, is a disadvantage. FIG. 4f illustrates the camera 420 in a complementary position, wherein the direction of the offset is inverted. In the exemplified situations of FIGS. 4e and 4f, the image will be displaced vertically. The displacement caused by the up-down mechanical misalignment according to FIGS. 4e and 4f may be compensated for using the disclosed method.

FIG. 6a illustrates a camera 500, similar to the camera 300 illustrated in FIG. 3a, but unlike this camera 300, the camera block 512 of the camera 500 is rotationally displaced. FIG. 5b illustrates the camera 500 in a complementary position. Numerals with the last two digits of FIG. 3a and FIG. 3b correspond to the numerals with the two last digits of FIG. 6a and FIG. 5b. Such a rotational displacement may arise when the camera block is mounted or because of other manufacturing inaccuracies.

As in the camera 400 illustrated in FIG. 4a and FIG. 4b, the displacement of the camera block 516 implies that a point of the image is shown differently, in terms of placement, in the image received in the position of the camera 500 illustrated in FIG. 6a and in the complementary position of the camera 500 illustrated in FIG. 5b.

In general, misalignments may be divided into six categories, namely:
1) Translation displacement of the camera block with respect to the pan axis, i.e. the axis around which the camera block is panned,
2) Translation displacement of the camera block with respect to the tilt axis, i.e. the axis around which the camera block is tilted,
3) Translation displacement of the camera block with respect to the intended optical axis of the camera block,
4) Rotational displacement of the camera block with respect to the pan axis,
5) Rotational displacement of the camera block with respect to the tilt axis, and
6) Rotational displacement of the camera block with respect to the intended optical axis.

The translation misalignments as disclosed in categories 1-3 are in general small and may be compensated for using minor mechanical adjustments. Examples of misalignments according to category 2 may be found with reference to FIGS. 4a and 4b. Misalignments as disclosed in categories 4 and 5 may be difficult to compensate for. In FIGS. 4c and 4d we consider the problem as disclosed in category 4. In FIGS. 4e and 4f we consider the problem as disclosed in category 5. Misalignments as disclosed in category 6 will in most cases require rotation of the image capturing sensor and/or post image processing, using specific image analysis software.

All the above disclosed displacement errors may be influenced more or less by zooming operations (and hence also focus operations), so-called dynamic misalignment. But also in such cases the misalignments according to categories 4 and 5 are the most apparent, and which need to be compensated for.

Further, the problem that a point in the image is shown differently in an upright position and in a flipped position may, for instance, also arise because of hardware misalignments in the steering motor system, which is herein exemplified as the pan steering motor 308/408/508 and the tilt steering motor 310/410/510, mounting inaccuracies between the mounting bracket 306/406/506 and the pan steering motor 308/408/508, mounting inaccuracies between the pan steering motor 308/408/508 and the tilt steering motor 310/410/510, mounting inaccuracies between the tilt steering motor 310/410/510 and the camera block 312/412/512 and other hardware misalignments, such as optical misalignments.

A pan-tilt camera may be achieved in a number of ways, for instance the tilt steering motor and the pan steering motor may switch places, i.e. the tilt steering motor may be attached to the mounting bracket instead of the pan steering motor as illustrated in FIGS. 3a, 3b, 4a, 4b, 5a and 5b. However, independent of the design of the pan-tilt camera, if there are more than one way to reach a position, hardware misalignments can result in an unwanted displacement of the image.

As illustrated in FIGS. 4a, 4b, 4c, 4d, 4e, 4f, 5a and 5b, one way of reaching a position is by using complementary coordinates. However, a position may also be reached by using different mechanical coordinates if, for instance, the pan range of the camera is equal or greater than 360°.

If the camera block 312/412/418/422/512 is rotationally displaced in such a way that the pan axis and the tilt axis are not perpendicular to the optical axis of the optical system 314/414/416/420/514, a severe misalignment error will arise. Hence, it is of great advantage to compensate for this type of misalignment error.

Figure 6:
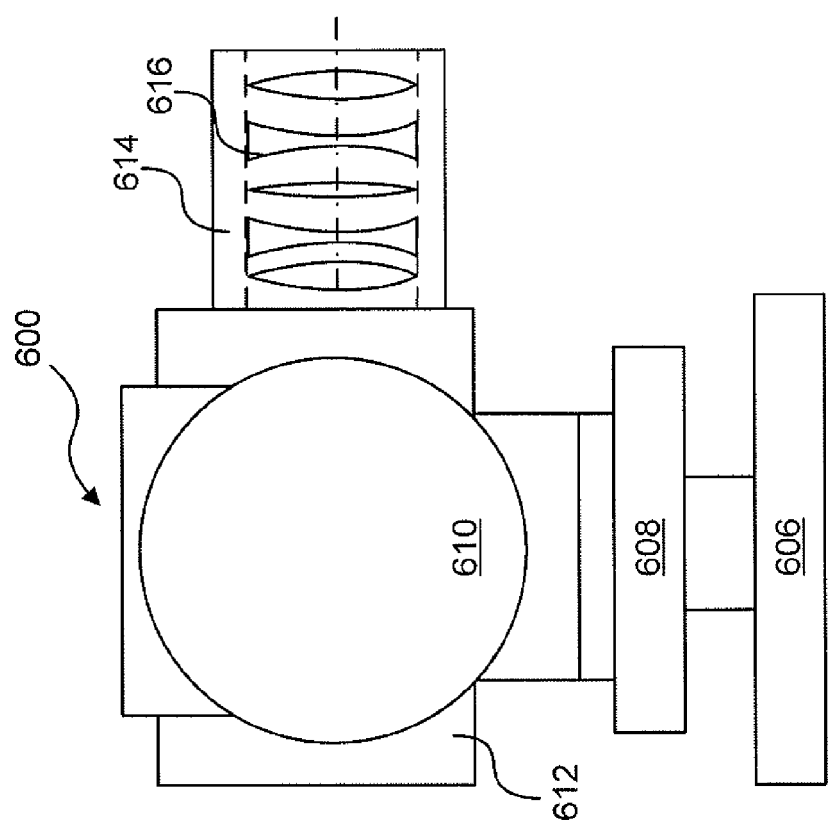
FIG. 6 illustrates a side view of a camera without optical misalignments.

FIG. 6 illustrates a side view of a camera 600, similar to the camera 300 illustrated in FIGS. 3a and 3b. Numerals with the last two digits of FIG. 3a and FIG. 3b correspond to the numerals with the two last digits of FIG. 6.

The optical system 614 comprises a number of lenses 616. If the camera 600 comprises a zooming function, the lenses 616 of the optical system 614 are adapted to be moved in relation to each other.

Figure 7:
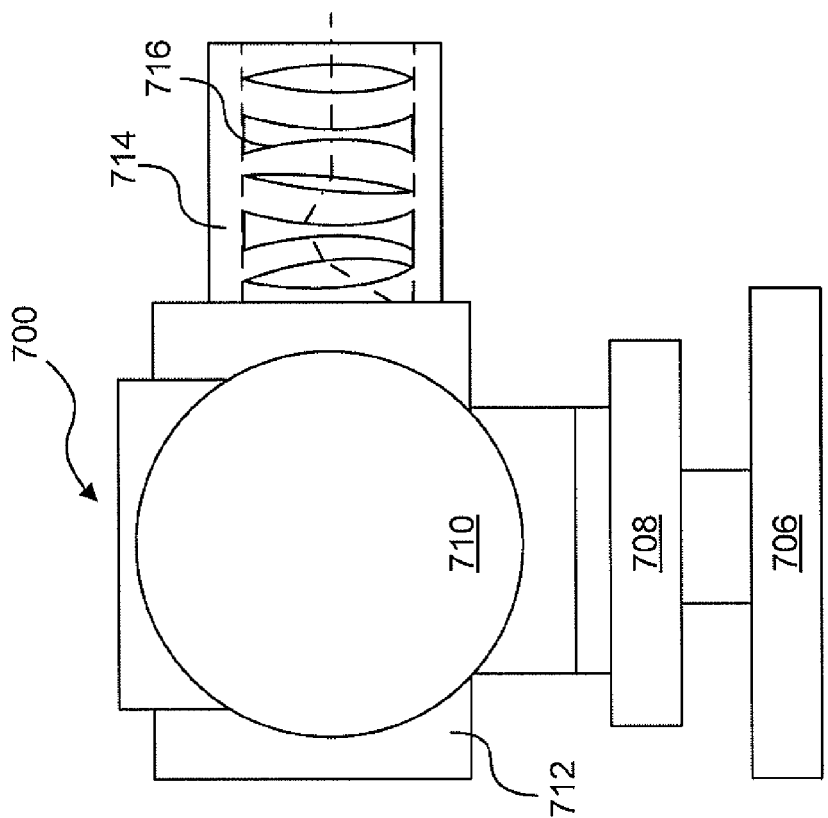
FIG. 7 illustrates a side view of a camera with optical misalignments.

FIG. 7 illustrates a side view of an exemplified camera 700, similar to the camera 300 illustrated in FIGS. 3a and 3b. Numerals with the last two digits of the example illustrated in FIG. 3a and FIG. 3b correspond to the numerals with the two last digits of the example illustrated in FIG. 7.

Unlike the camera 600 illustrated in FIG. 6, the lenses 716 comprised in the optical system 714 are misaligned. Such misalignment may be a result of the mounting of the lenses 716, a result of inaccuracies in the lenses 716 or a combination of them.

If the camera 700 comprises zooming functionality, the error of the misaligned lenses 716 can depend of the zoom position, in other words the degree of zoom, of the optical system 714 and/or the focus position of the optical system 714. The misalignment of the lenses 716 may arise because the lenses are not directed properly or that the lenses 716 are not placed correctly in relation to each other. If the zoom position of the optical system and/or the focus position are changed the error may in turn change.

In order to reduce the effect of hardware misalignments, including mechanical misalignments as illustrated in FIGS. 4c, 4d, 4e and 4f and/or optical misalignments as illustrated in FIG. 7, a calibration procedure is performed for the camera. Preferably, since different cameras have different hardware misalignments, the calibration procedure is performed for each camera individually. If there is a need to compensate the coordinate system for mechanical and optical axis misalignment it is first necessary to measure this misalignment. The camera calibrator may do this at unit production by e.g. using image analysis and a specific calibration pattern. That is, the calibration procedure is preferably made during the manufacturing of the camera, i.e. before the camera reaches the end customer. By calibrating the camera in both upright and flipped spaces as well as at different zoom levels a compensation table may be built. This table is preferably stored in the camera and a new table is stored if the camera is re-calibrated.

This table may in general terms comprise a relationship between pan and tilt positions and their corresponding complementary pan and tilt positions.

Figure 8:
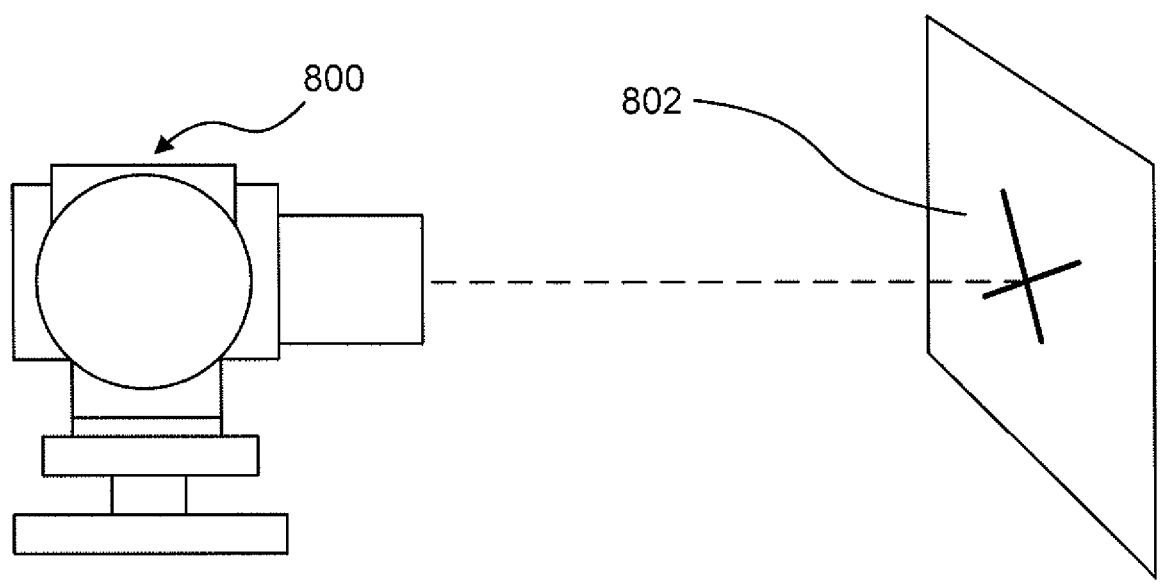
FIG. 8 illustrates an example of a calibration set-up.

A possible set-up, when performing the calibration procedure, is illustrated in FIG. 8. In this calibration set-up the camera 800 is directed towards a reference mark 802.

The calibration procedure for a camera without zooming functionality may be described as:
   direct the camera is such a way that the reference mark is positioned in the center of the image,
   store the pan steering motor position and the tilt steering motor position, hereafter referred to as mechanical coordinates, for this first position in a memory,
   flip the camera to a corresponding complementary position,
   direct the camera is such a way that the reference mark is positioned in the center of the image, and
   store the mechanical coordinates of this second position in said memory.

Based upon the stored mechanical coordinates of the first and second position, calibration data is determined and stored in the memory. The calibration data may be determined by calculating a difference between the mechanical coordinates and comparing this difference with a theoretic difference. For instance, the pan position of the first and second position can be determined as +178.7° and −181.3°, respectively. In theory, the difference between theses two values 180°, i.e. the maneuverable part of the camera is rotated half a turn in order to reach the second position from the first position. Hence, because of this, the calibration data may upon the calibration procedure comprise −1.3° in pan compensation for the present zoom position. The memory can be placed in the camera.

Moreover, if several values are utilised in order to determine calibration data, an intermediate position may be calculated.

Figure 9:
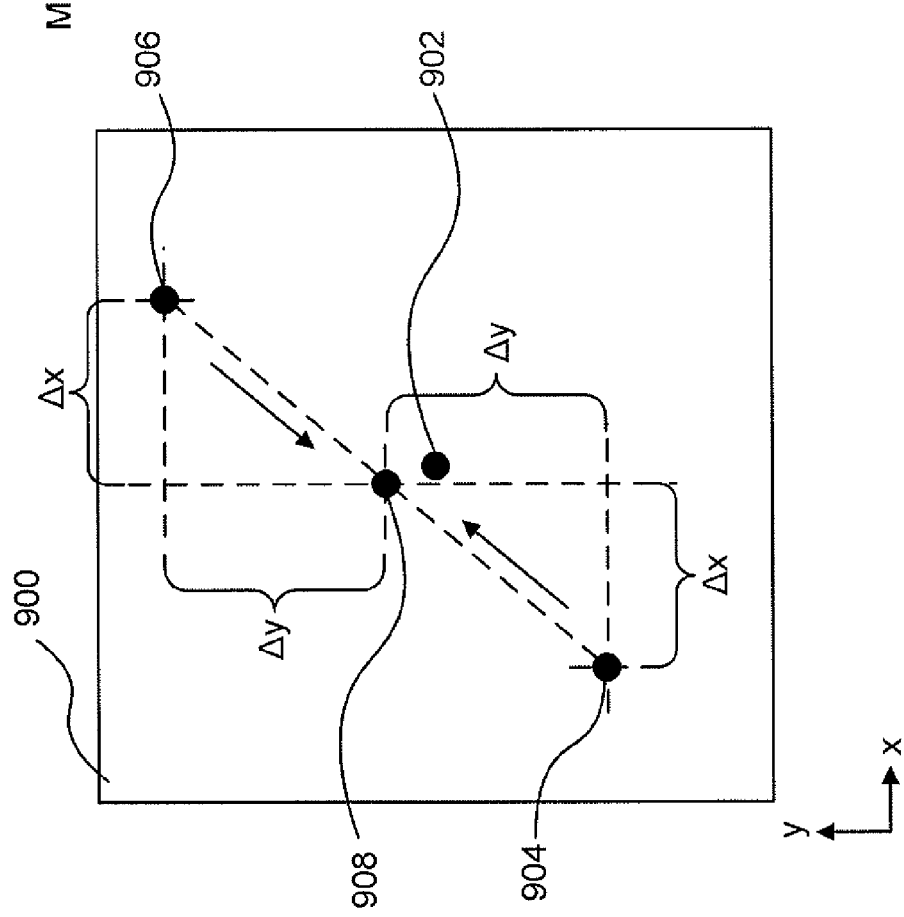
FIG. 9 illustrates an image comprising a theoretic center point, a first position center point and a second position center point.

FIG. 9 illustrates an example of an image 900 comprising a theoretic reference center point 902, i.e. the center point for a camera without hardware misalignments, a first position center point 904, i.e. the center point achieved in the first position for a camera having hardware misalignments, and a second center point 906, i.e. the center point achieved in the second position for the camera having hardware misalignments, wherein the second position is a complementary position to the first position.

Since the first position 904 and the second position 906 are complementary positions, a position between these two positions, i.e. an intermediate position, illustrated as point 908, may be used as an approximation of a reference center point. This implies, in turn, that the mechanical coordinates in the first position is to be compensated by using a horizontal compensation component Δx and a vertical compensation component Δy, as illustrated in FIG. 9. In a similar way, in order to compensate the mechanical coordinates of the second position, a horizontal compensation component −Δx and a vertical compensation component −Δy are to be used, as illustrated in FIG. 9.

The compensation components Δx and Δy can be approximated to be the same for each position of the upright space, and, similarly, the compensation components −Δx and −Δy can be approximated to be the same for each position of the flipped space. Hence, the misalignment error of the mechanical misalignments, such as the ones illustrated in FIGS. 4a, 4b, 5a and 5b, may be referred to as a statical error.

Figure 10:
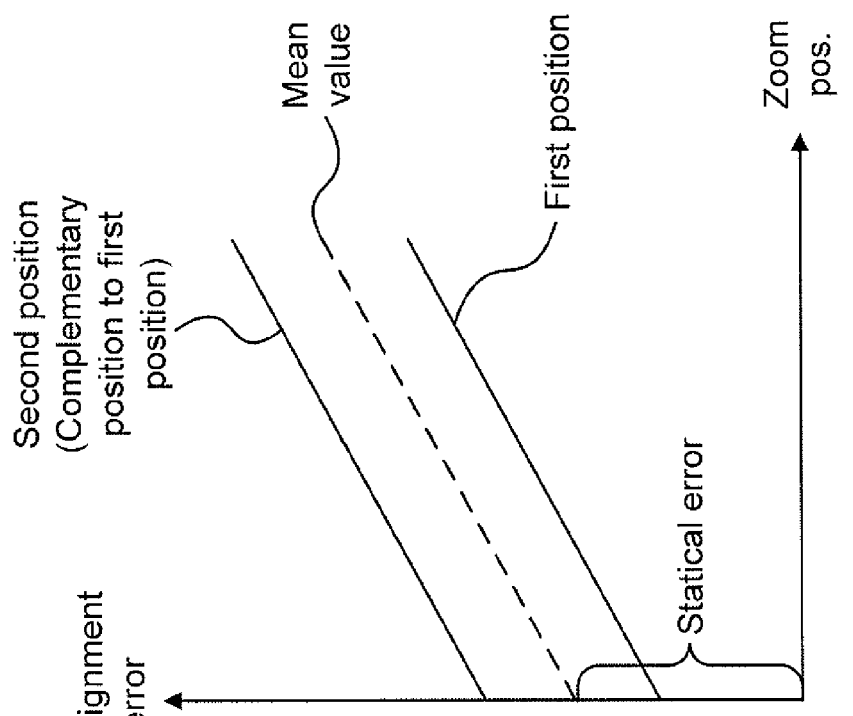
FIG. 10 illustrates a static and a dynamic misalignment error.

The misalignments caused by the optical misalignment, as illustrated in FIG. 7, may give rise to a dynamic error, wherein the dynamic error depends on the zoom position of the camera, as schematically illustrated in FIG. 10. The dynamic error is in most cases not a linear function of the zoom positions, although illustrated in such a way in FIG. 10.

Because of this dynamic error the calibration procedure, described above and illustrated in FIG. 10, may be repeated for a number of zoom positions, or in other words zoom degrees. For instance, a table may be achieved by measure the compensation components for the zoom degrees of 1×, 2×, 5×, 10× and 35×, respectively. Preferably, the procedure starts at the highest zoom degree, such as 35×, since it is easier to find the exact position of the reference mark at higher zoom degrees.

Figure 11A:
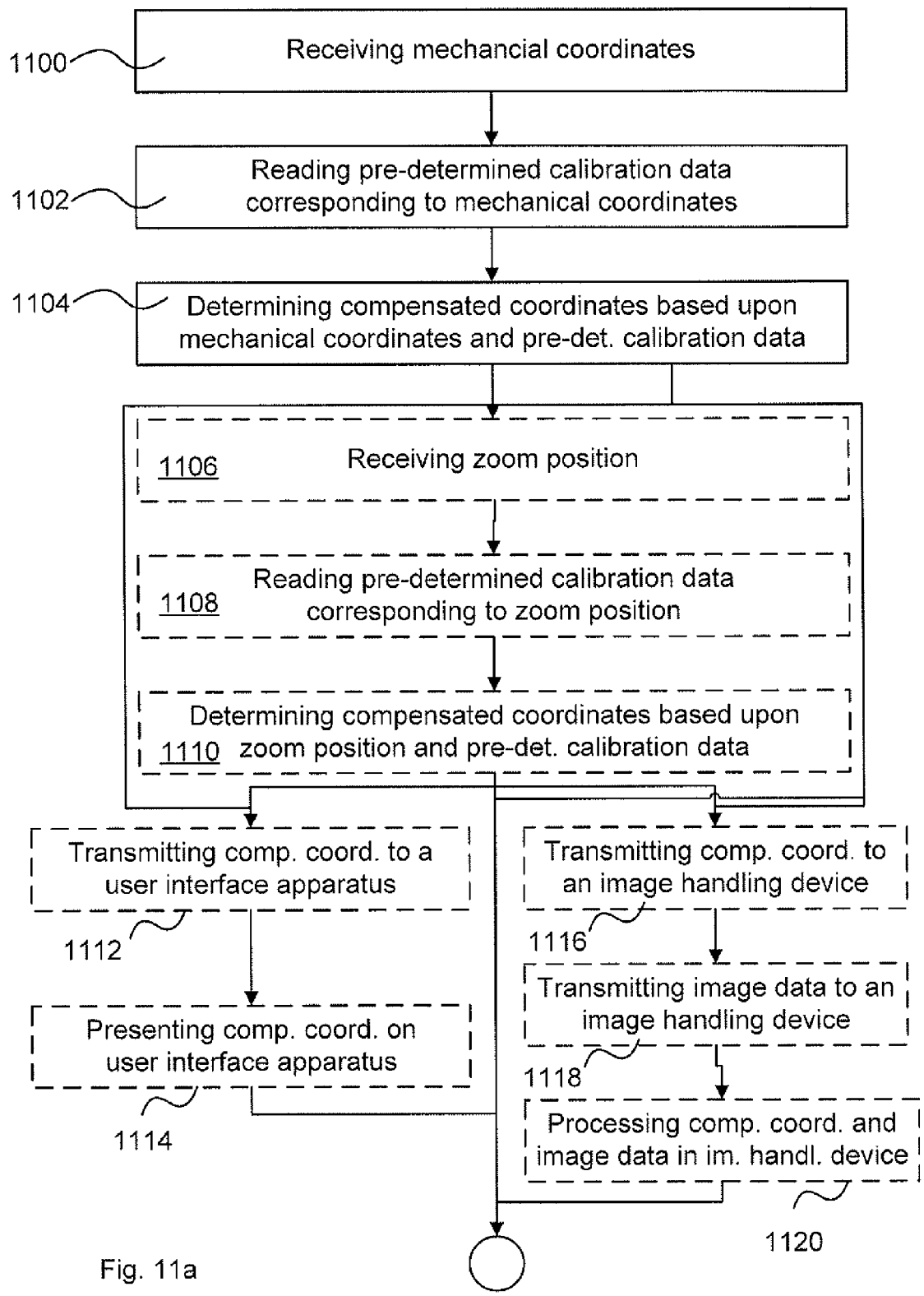
FIGS. 11a and 11b illustrate a method for compensating hardware misalignments in a camera.
Figure 11B:
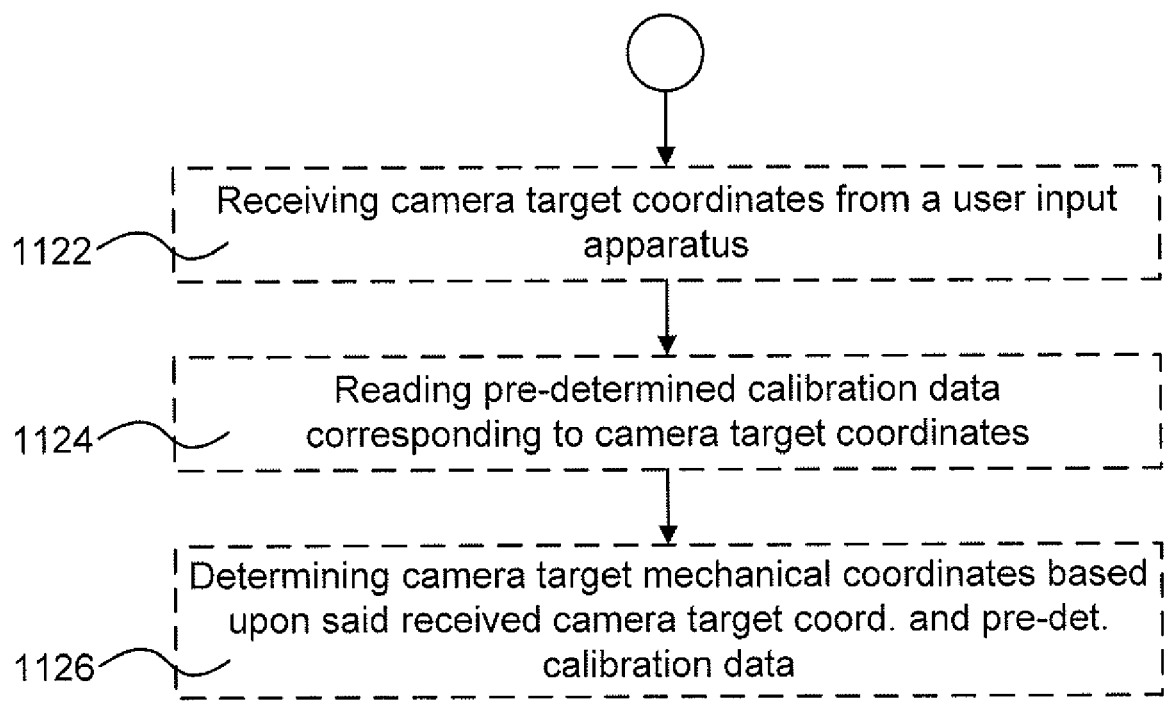

FIGS. 11a and 11b generally illustrates a method for compensating hardware misalignments in a camera.

In a first step 1100, mechanical coordinates are received and in a second step 1102 pre-determined calibration data corresponding to the mechanical coordinates is read from a memory. This memory may be comprised in the camera, and the calibration data may be achieved as described above.

Next, in a third step 1104, compensated coordinates are determined based upon the mechanical coordinates and the calibration data.

Optionally, in a step 1106, a zoom position may be received, and, in a step 1108, pre-determined calibration data corresponding to the zoom position may be read from a memory. Next, in a step 1110, compensated coordinates may be determined based upon the zoom position and the pre-determined calibration data.

Optionally, in a step 1112, the compensated coordinates may be transmitted to a user interface apparatus, and, in a step 1114, the compensated coordinates may be shown on the user interface apparatus.

Optionally, in a step 1116, the compensated coordinates may be transmitted to an image handling device, and image data may be transmitted to the image handling device, step 1118. In the image handling device, the compensated coordinates and the image data may be processed, step 1120.

Optionally, in a step 1122, camera target coordinates may be received from a user interface apparatus, and, in a step 1124, pre-determined calibration data corresponding to the camera target coordinates may be read. Based upon the camera target coordinates and the pre-determined calibration data, camera target mechanical coordinates may be achieved, step 1126.

Figure 12:
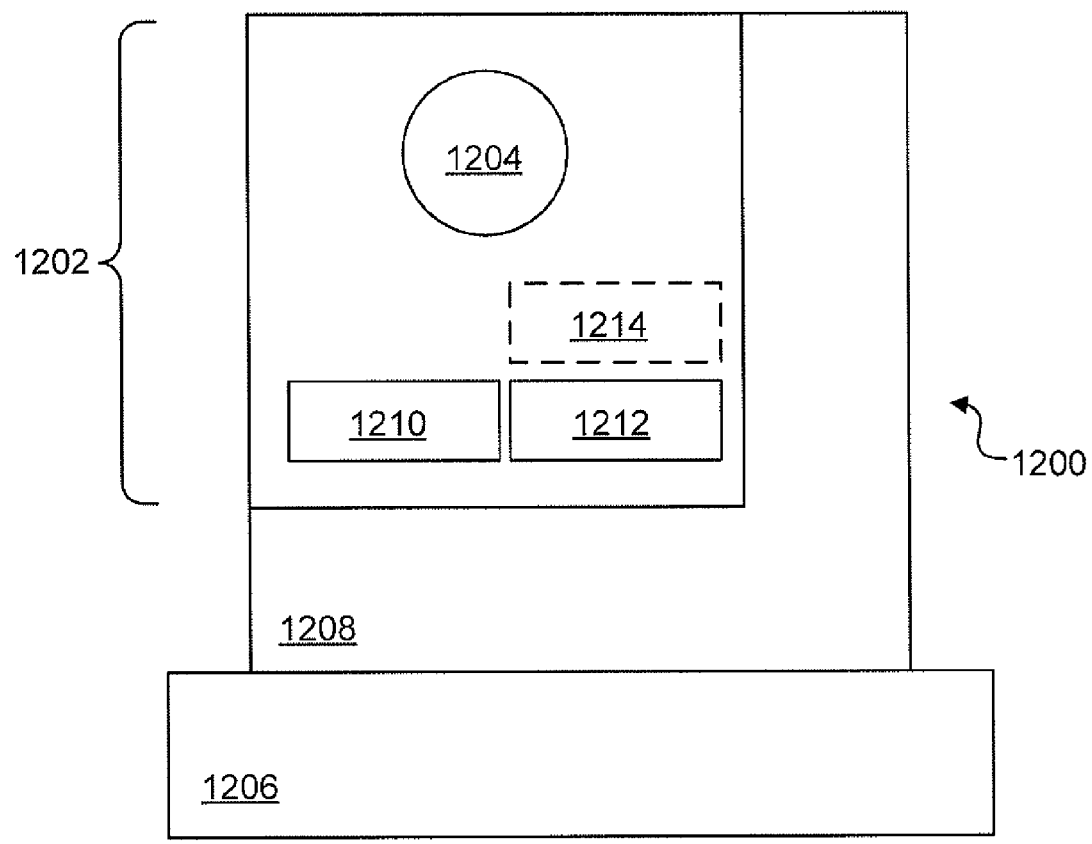
FIG. 12 illustrates a camera with built-in functionality for compensating hardware misalignments.

FIG. 12 generally illustrates an embodiment of a camera 1200 with built-in functionality for compensating hardware misalignments. The camera 1200 comprises a maneuverable part 1202, which in turn comprises an optical system 1204, and a fixed part 1206. In order to control the maneuverable part 1202, a steering motor system 1208 is provided. Further, a memory 1210 comprising pre-determined calibration data, a processor 1212 and, optionally, a transmitter 1214 are provided. In this particular embodiment, the memory 1210, the processor 1212 and the transmitter 1214 are comprised in the maneuverable part 1202, but they may also be comprised in the fixed part 1206 or in an external module. Further, the transmitter 1214 may be a network interface card. The transmitter 1214 and the processor 1212 may be comprised in one and the same integrated circuit.

Figure 13:
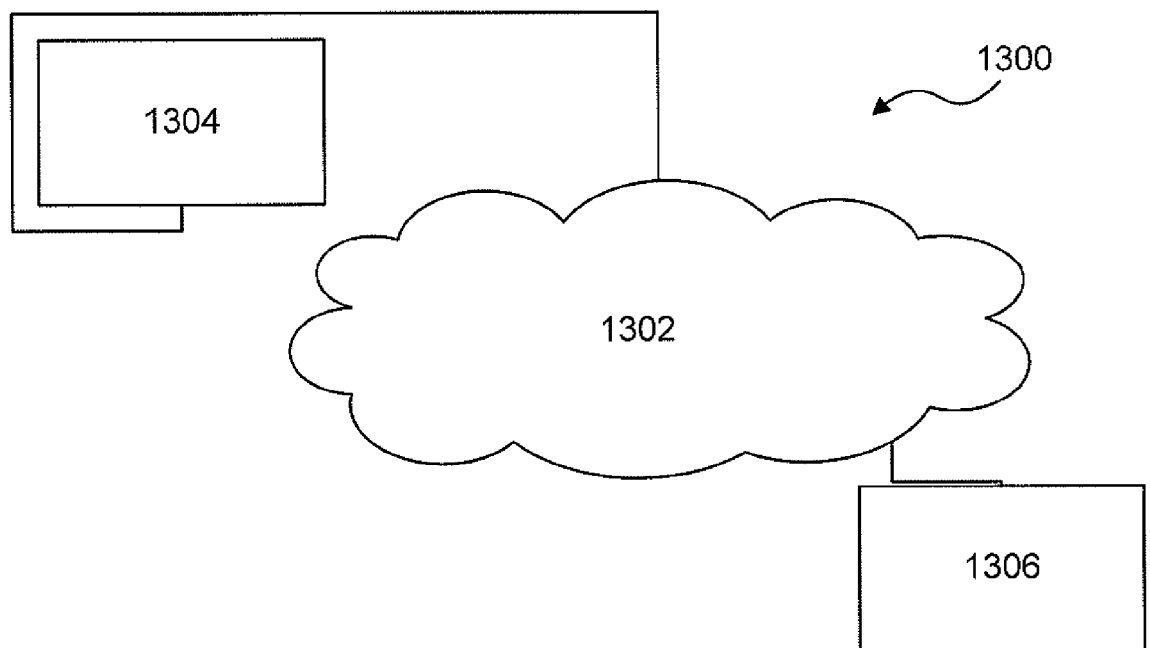
FIG. 13 illustrates a system comprising a camera and a user interface apparatus.

FIG. 13 generally illustrates a system 1300 comprising a data network 1302, a camera 1304 and a user interface apparatus 1306.

The invention has mainly been described above with reference to a few embodiments. However, as is readily appreciated by a person skilled in the art, other embodiments than the ones disclosed above are equally possible within the scope of the invention, as defined by the appended patent claims.

What is claimed is:

1. A method for compensating hardware misalignments in a camera comprising a maneuverable part and a fixed part, wherein said maneuverable part is controlled by a steering motor system and comprises a camera block, said method comprising:

receiving mechanical coordinates from said steering motor system, wherein said mechanical coordinates correspond to a pan and tilt position, said pan and tilt position having a complementary pan and tilt position, wherein the complementary pan and tilt position is a position that is reached by the steering motor system rotating the maneuverable part 180 degrees around a pan axis and rotating the camera block an angle corresponding to $-2T_u-180$ degrees around a tilt axis, wherein $T_u$ is in the range of 0 to $-90$ degrees and $T_u$ is the tilt coordinate of the mechanical coordinates;

reading pre-determined calibration data corresponding to said received mechanical coordinates from a memory comprised in said camera, wherein said pre-determined calibration data comprises a horizontal compensation component and a vertical compensation component, wherein said compensation components represent the difference between the mechanical coordinates of the pan and tilt position and the mechanical coordinates of an intermediate position, which is between the pan and tilt position and the complementary pan and tilt position; and determining compensated coordinates based upon said received mechanical coordinates and said pre-determined calibration data.

2. The method according to claim 1, wherein said maneuverable part comprises a zooming optical system, said method further comprises:

receiving at least one zoom position of said zooming optical system;

reading pre-determined calibration data corresponding to said at least one zoom position from said memory; and determining compensated coordinates based upon said received at least one zoom position and said pre-determined calibration data.

3. The method according to claim 1, wherein said method further comprises:

transmitting said compensated coordinates from said camera to a user interface apparatus; and presenting said compensated coordinates on said user interface apparatus.

4. The method according to claim 1, wherein said method further comprises:

transmitting image data to an image handling device;

transmitting said compensated coordinates to said image data handling device; and processing said image data and said compensated coordinates in said image data handling device.

5. The method according to claim 1, wherein said method further comprises:

receiving camera target coordinates;

reading pre-determined calibration data corresponding to said received camera target coordinates from said memory comprised in said camera;

determining camera target mechanical coordinates based upon said received camera target coordinates and said pre-determined calibration data; and moving said maneuverable part of said camera in accordance to said determined camera target mechanical coordinates.

6. The method according to claim 1, wherein a pan range of said maneuverable part is equal or greater than 180° thereby enabling said maneuverable part to reach at least one view by using a plurality of different mechanical coordinates, wherein said pre-determined calibration data comprises a combination of a set of said plurality of different mechanical coordinates.

7. The method according to claim 6, wherein said plurality of different mechanical coordinates comprises a set of upright mechanical coordinates and a set of flipped mechanical coordinates.

8. The method according to claim 6, wherein said pre-determined calibration data comprises at least one difference value determined by subtracting one of said different mechanical coordinates by a theoretic value.

9. The method according to claim 6, wherein said pre-determined calibration data comprises an intermediate position of said set of said plurality of different mechanical coordinates.

10. The method according to claim 1, wherein said hardware misalignments are caused by rotation around at least one axis in the group of a pan axis and a tilt axis.

11. A camera comprising:

a maneuverable part comprising an optical system and a camera block, a fixed part, a steering motor system arranged to control said maneuverable part, a memory arranged to hold pre-determined calibration data, a processor configured to receive mechanical coordinates from said steering motor system, wherein said mechanical coordinates correspond to a pan and tilt position, said pan and tilt position having a complementary pan and tilt position, wherein the complementary pan and tilt position is a position that is reached by the steering motor system rotating the maneuverable part 180 degrees around a pan axis and rotating the camera block an angle corresponding to $-2T_u-180$ degrees around a tilt axis wherein $T_u$ is in the range of 0 to $-90$ degrees and $T_u$ is the tilt coordinate of the mechanical coordinates, to read pre-determined calibration data from said memory, wherein said pre-determined calibration data comprises a horizontal compensation component and a vertical compensation component, said compensation components representing the difference between the mechanical coordinates of the pan and tilt position and the mechanical coordinates of an intermediate position, which is between the pan and tilt position and the complementary pand and tilt position, and to determine compensated coordinates based upon said mechanical coordinates and said pre-determined calibration data.

12. The camera according to claim 11, wherein said optical system of said maneuverable part comprises a zooming optical system, and said processor is further configured to receive at least one zoom position from said zooming optical system, and to determine compensated coordinates based upon said at least one received zoom position and said pre-determined calibration data.

13. The camera according to claim 11, further comprising a transmitter adapted to transmit said compensated coordinates from said camera to a user interface apparatus.

14. The camera according to claim 13, wherein said transmitter is further adapted to transmit image data and said compensated coordinates to an image handling device.

15. The camera according to claim 11, wherein said processor is further configured to receive camera target coordinates, to read pre-determined calibration data corresponding to said received camera target coordinates from said memory comprised in said camera, and to determine camera target mechanical coordinates based upon said received camera target coordinates and said pre-determined calibration data, and wherein said steering motor system is configured to move said maneuverable part of said camera in accordance to said determined camera target mechanical coordinates.

16. The camera according to claim 11, wherein a pan range of said maneuverable part is equal to or greater than 180° thereby enabling said maneuverable part to reach at least one field of view by using a plurality of different mechanical coordinates, wherein said pre-determined calibration data comprises a combination of a set of said plurality of different mechanical coordinates.

17. The camera according to claim 16, wherein a tilt range of said maneuverable part of said camera includes said pan axis.

18. The camera according to claim 16, wherein said plurality of different mechanical coordinates comprises a set of upright mechanical coordinates and a set of flipped mechanical coordinates.

19. The camera according to claim 16, wherein said pre-determined calibration data comprises at least one difference value determined by subtracting one of said different mechanical coordinates by a theoretic value.

20. The camera according to claim 16, wherein said pre-determined calibration data comprises an intermediate position of said set of said plurality of different mechanical coordinates.

21. A system comprising:
a data network;
a user interface apparatus connected to said data network; and
at least one camera according to claim 11.

22. A non-transitory computer-readable medium having instructions for causing a computer to execute a method comprising:
receiving mechanical coordinates from a steering motor system, wherein said mechanical coordinates correspond to a pan and tilt position, said pan and tilt position having a complementary pan and tilt position, wherein the complementary pan and tilt position is a position that is reached by the steering motor system rotating the maneuverable part 180 degrees around a pan axis and rotating a camera block an angle corresponding to $-2T_u-180$ degrees around a tilt axis, wherein $T_u$ is in the range of 0 to $-90$ degrees and $T_u$ is the tilt coordinate of the mechanical coordinates;
reading pre-determined calibration data corresponding to said received mechanical coordinates from a memory, wherein said pre-determined calibration data comprises a horizontal compensation component and a vertical compensation component; wherein said compensation components represent the difference between the mechanical coordinates of the pan and tilt position and the mechanical coordinates of an intermediate position, which is between the pan and tilt position and the complementary pan and tilt position; and
determining compensated coordinates based upon said received mechanical coordinates and said pre-determined calibration data.

* * * * *